United States Patent [19]

Janes

[11] Patent Number: 4,700,120
[45] Date of Patent: Oct. 13, 1987

[54] CONTROL FOR A STEPPER MOTOR OR OTHER SYNCHRONOUS MOTOR

[75] Inventor: Roderick S. Janes, Solihull, England

[73] Assignee: Lucas Industries public limited company, Birmingham, United Kingdom

[21] Appl. No.: 862,035

[22] Filed: May 12, 1986

[30] Foreign Application Priority Data

May 11, 1985 [GB] United Kingdom ............... 8511980

[51] Int. Cl.$^4$ ............................................. G05B 19/40
[52] U.S. Cl. .................................................. 318/696
[58] Field of Search ............................... 318/685, 696

[56] References Cited

U.S. PATENT DOCUMENTS 4,025,837 5/1977 Meier et al. ......................... 318/561
4,126,821 11/1978 Cannon ................................ 318/696

Primary Examiner—William M. Shoop, Jr.
Assistant Examiner—Saul M. Bergmann

[57] ABSTRACT

Closed loop control for a stepper motor or other synchronous motor. A digital/frequency interface provides drive current to the motor at a frequency determined by output of speed limiter. Required rate-of-change of speed is calculated and applied via rate-of-change limiter to adder which sums rate-of-change signal with existing speed signal. The required rate-of-change is calculated by a calculator in accordance with existing speed, remaining distance to run, and the predetermined rate-of-change signal, to ensure that motor is brought to rest in controlled fashion without overshoot which normally occurs in closed loop control with rate-of-change limitation.

4 Claims, 3 Drawing Figures

CONTROL FOR A STEPPER MOTOR OR OTHER SYNCHRONOUS MOTOR

This invention relates to a control for a stepper motor or other synchronous motor. The control is intended primarily for use in controlling a stepper motor to provide a mechanical input for a hydromechanical servo-mechanism driving a fuel control valve in a gas turbine engine fuel system. The control is, however, also applicable to many other different tasks.

Conventional closed loop position controls make use of a position error signal (i.e. the difference between a position demand signal and an actual position signal) to determine motor speed. With stepper motors, control can conveniently be effected without any internal closed loop within the position loop by varying the frequency of the pulses supplied to the motor windings, but it has been found necessary to limit the frequency and also effective and expedient to limit the rate of change of frequency to allow the higher speed range of the stepper motor (known as the slewing range) to be utilised.

It can be shown mathematically that a closed loop stepper motor control in which frequency rate of change limitation is applied will produce large overshoot in response to large step demand if the frequency is made linearly dependent on the position error.

It is an object of the present invention to provide a method of and apparatus for controlling a stepper or other synchronous motor in which this large overshooting is suppressed to negligible levels.

The invention overcomes this difficulty by overriding normal linear control mode as the commanded motor speed exceeds a certain level and establishing a stopping distance mode control. Effectively a calculation is made to establish any speed change required if the motor is to be stopped at the required stopping position taking into account the rate of speed change limitation, and motor speed is corrected accordingly.

Basically this can be done by calculating the stopping distance $S_d$ at the existing speed u, from the equation $$S_d = u \cdot \frac{(|u| + F)}{2F} \times h$$

where F is the deceleration limit and h is the periodicity of the discrete time calculations, (1/h representing gain), comparing this with the actual remaining distance Sa to derive a stopping distance error $\Delta S = S_a - S_d$, and calculating the required speed change $\Delta u$ from the equation $$\Delta u = \frac{2KF}{|u| + F} \cdot \Delta S$$

where, K=gain=1/h
Alternatively, it is much simpler to obtain the same value for $\Delta u$ directly, from the equation $$\Delta u = \frac{2KF}{|u| + F} \cdot S_a - u.$$

Corrections may be required to update data collected in each cycle of operation as will be explained hereinafter.

In the accompanying drawings.

Figure 1:
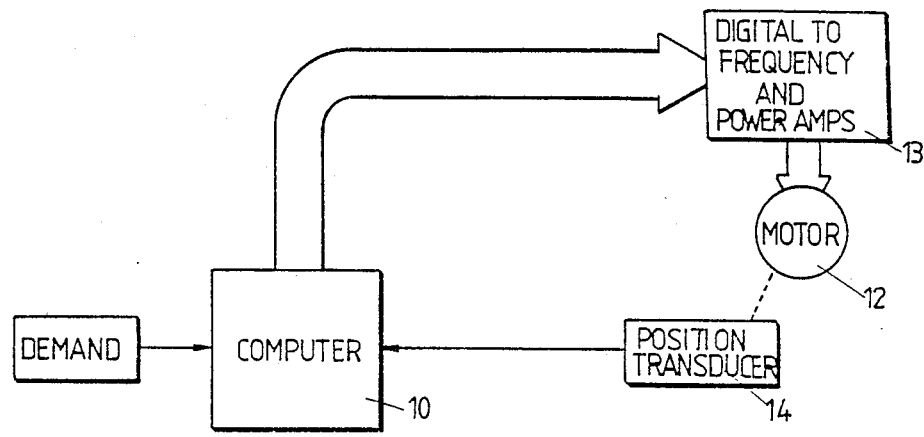
FIG. 1 is a block diagram of an example of an apparatus for controlling a stepper motor in accordance with the present invention.

Referring firstly to FIG. 1 the apparatus used includes a computer 10 the output of which is used to control the speed of a stepper motor 12 via a known digital to frequency converter/power amplifier combination 13. The digital output from computer 10 contains speed and direction data which the unit 13 converts to an appropriately phased multi-phase supply to the motor at the appropriate frequency. A position transducer 14 driven by the stepper motor provides an "actual position" signal to the computer 10.

The computer 10 may control several motors 12 via a like number of units 13, a corresponding number of transducers 14 providing position signals to the main computer. In this case, outputs from the computer 10 to the units 13 are provided in sequence.

Figure 2:
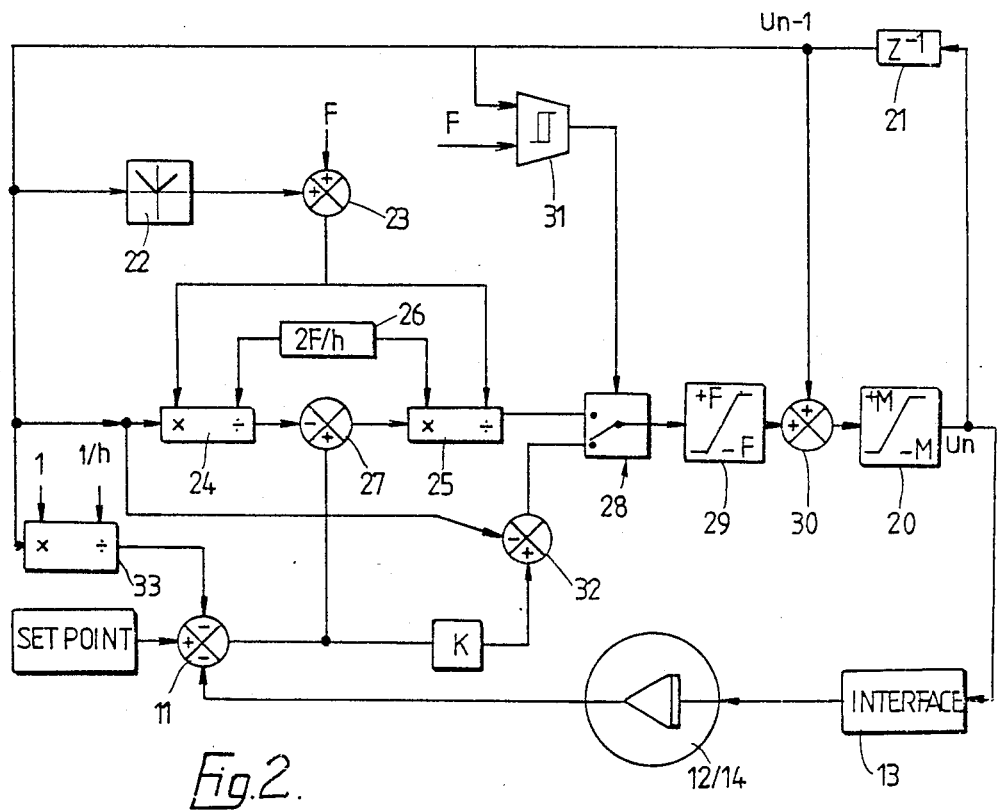
FIG. 2 is a functional block diagram of one example of a control scheme which can be used in tne apparatus of FIG. 1, and FIG. 3, is a similar functional block diagram of another example of a control scheme.

Turning now to FIG. 2 the combination of the motor 12 and position transducer 14 are shown as a single unit for simplicity. The output of the position transducer is applied to the computer in which set point data is produced and compared with this output (in subtractor 11). As will be explained hereinafter a correction signal from the computer is applied to compensate for the error which occurs as a result of its cyclic digital operation in which data processed therein is always up to one cycle out of date. The subtractor provides a signal representing the position error, i.e. the distance still to be travelled before the motor shaft reaches the set point.

The output of the computer is provided by an output limiter 20 which limits the digital output to a value M representing the highest speed at which the motor will run predictably without stall. This output can therefore be taken as representing the actual motor speed, and the need for a motor speed transducer, or for arrangements for differentiating the position transducer output to provide an actual speed signal, is therefore avoided. The box 21 in FIG. 2 is included to show that the speed signal actually fed back to the rest of the control is that which was derived in the preceding calculation cycle.

The speed signal $u_{n-1}$ is supplied to an absolute value generator 22, the output of which is applied to an adder 23 which adds the value F to give the $|u| + F$ term in the equations given above. The output of adder 23 is applied to a multiplier section of a multiplier/divider unit 24 and to the divider section of another multiplier/divider unit 25. The divider section of unit 24 and the multiplier section of unit 25 receive a signal representing the value of the term 2F/h(26). The $u_{n-1}$ signal is applied to the input of unit 24 the output of which is applied to a subtractor 27 which also receives the position error signal. The output of subtractor 27 is applied as input to the unit 25. The output of unit 25 goes via a "switch" 28 to an "acceleration limiter" 29 the output of which is added to the $u_{n-1}$ signal in an adder 30, the output of which is supplied to the output limiter 20.

It will be appreciated that the output of unit 24 represents the stopping distance at the currently existing speed. Comparator 27 compares this distance with the actual remaining distance and its output represents the error between these two distances. The unit 25 provides as output a speed error signal which, after limitation, if any, by limiter 29, is added to the actual speed signal $u_{n-1}$ to derive the speed signal for the next cycle.

Switch 28 operates to select whether "normal" linear speed control or the stopping distance mode of control is used. Switch 28 is controlled by a comparator 31 which selects linear control whenever the value of $u_{n-1}$ is less than the value of F (F being the maximum permissible change in u in a cycle). In linear control mode the $u_{n-1}$ signal is compared by a comparator 32 with a value Kx position error, K normally being chosen to be 1/h (where h is the cycle duration). The resulting error signal is applied via switch 28 and limiter 29 to adder 30. This mode selection arrangement prevents instability at low speeds by reducing the gain at these low speeds and enables the control to hold the motor shaft at the set point.

The correction signal which is applied to the main computer as mentioned above is derived from yet another multiplier/divider 33 which receives as input the $u_{n-1}$ signal and divides this by 1/h. Thus its output represents the distance the motor shaft will have travelled at the speed $u_{n-1}$ in one cycle.

In operation, a change in set point, following an interval during which the motor shaft was at the previous set point will result in a step change in the position error signal from zero to some new value. Since $u_{n-1}$ is zero at this time, acceleration of the motor shaft will, in the first operation cycle, be under linear control and, assuming this new value is a relatively large one, the limiter 29 will operate to set the new speed at the value F. The next cycle will also be in linear control mode so that for the following cycle the speed will be 2F. Thereafter stopping distance mode control will apply until the speed falls below the value F. Thus the motor accelerates uniformly until either the stopping distance control starts to reduce the speed, or the maximum speed M is reached whereafter the motor speed will stay at the value M until the stopping distance control starts to reduce the speed. In either case when the stopping distance signal from unit 24 exceeds the error signal, deceleration will commence and the motor will be slowed and stopped at the set point without a large overshoot.

The above description explains what happens during a single finite journey from one point to another. In a real system the set point signal is likely to be varying all the time. The response of the stepper motor to such variations will, however, be apparent from the above.

Figure 3:
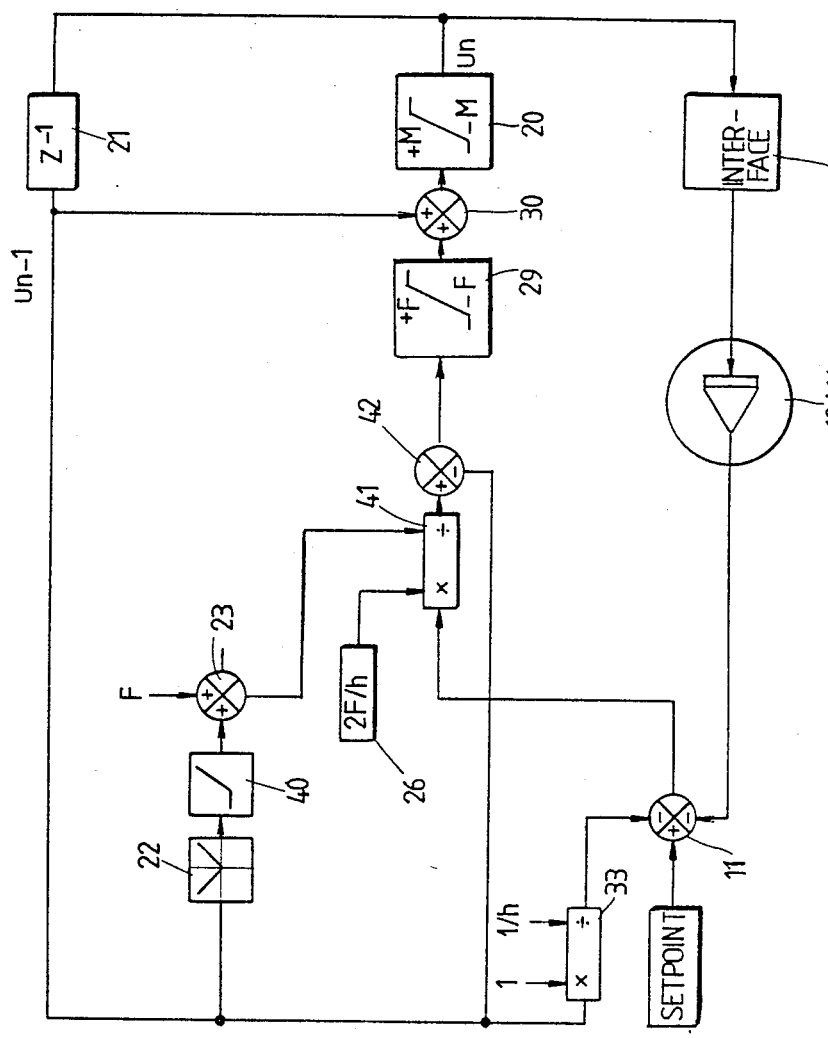

FIG. 3 is a view like FIG. 2 showing a simplified example of the invention. Items 11 12/14, 13, 20, 21, 22, 23, 26, 29, 30 and 33 are exactly as described above. The switch 28, its associated comparators 31 and 32 are omitted, however, and changeover from linear mode to stopping distance control mode is effected simply by the insertion of a limiter 40, between the absolute value generator 22 and the comparator 23. This has the effect of applying a lower limit of F to the value of $|u|$.

The remainder of the system is re-arranged to allow use of only one multiplier/divider unit instead of units 24 and 25. This unit 41 receives the remaining distance output of the main computer as its input rather than the $u_{n-1}$ signal. Multiplication by 2F/h and division by $|u|+F$ occurs in unit 41 and hence its output represents a speed which, in deceleration, is the speed at which the motor should be running if it is to stop in the remaining distance. A comparator 42 compares this with $u_{n-1}$ and its output which represents the necessary speed change is applied to limiter 29.

It will be appreciated that the example described in FIG. 3 can very readily be applied by means of a digital computer, the various boxes shown all representing computational steps.

I claim:

1. A control for a stepper motor or other synchronous motor comprising a position transducer (14) providing a motor position signal representing the motor position, first means (11) for comparing said position signal with a set point signal representing a desired position and producing a position error signal representing the distance the motor has to travel before reaching the desired position; second means (30) providing a motor controlling output representing a desired speed of the motor; interface means (13) providing drive current to the motor at a frequency determined by said second means; third means (20) limiting the magnitude of said motor controlling output to a predetermined level such that the motor can run without slip; fourth means sensitive to said position error signal for supplying to said second means a rate-of-change signal representing a desired rate of change of speed; fifth means (29) limiting the magnitude of said rate-of-change signal to a predetermined level such that motor speed can follow the speed changes demanded, characterised in that said fourth means comprises a function generator which receives said position error signal, a signal related to the actual speed of running, and a signal representing the predetermined level to which the rate-of-change signal is limited by said fifth means as inputs and, at least during deceleration as the set point is approached, generates an output signal representing the required rate-of-change of speed necessary for the motor to be brought to rest at the set point, taking into account the limitation imposed by said fifth means.

2. A control as claimed in claim 1 in which said function generator is a cyclically operating digital function generator having a first stage which calculates a stopping distance $S_d$ where $$S_d = u \cdot \frac{(|u| + F)}{2F} \cdot h$$

where
u is the existing speed
F is the rate-of-change limit and
h is the periodicity of the operating cycle;
a second stage which calculates a distance error $\Delta S$, where $\Delta S = S_a - S_d$ is the actual remaining distance; and a third stage which calculates the speed change $\Delta u$ required, where $$\Delta u = \frac{2 \cdot \frac{F}{h}}{|u| + F} \cdot S_a - u$$

3. A control as claimed in claim 1 in which said function generator is a cyclically operating digital function generator producing an output $\Delta u$ as follows $$\Delta u = \frac{2 \cdot \frac{F}{h}}{|u| + F} \cdot S_a - u$$

where
F is rate of change limit

Sa is the position error
u is the speed; and
h is the periodicity of the operating cycle.

4. A control as claimed in claim 2 or claim 3 further comprising means operable to detect when the absolute value of the speed $|u|$ is less than the value of the rate-of-change limit F and to set the value of $\Delta u$ in these circumstances to $Sa/h - u$.

* * * * *